I. FELTENSTEIN.
MASKING DEVICE FOR CAMERAS.
APPLICATION FILED MAY 15, 1915.
1,170,522.
Patented Feb. 8, 1916.
2 SHEETS—SHEET 1.
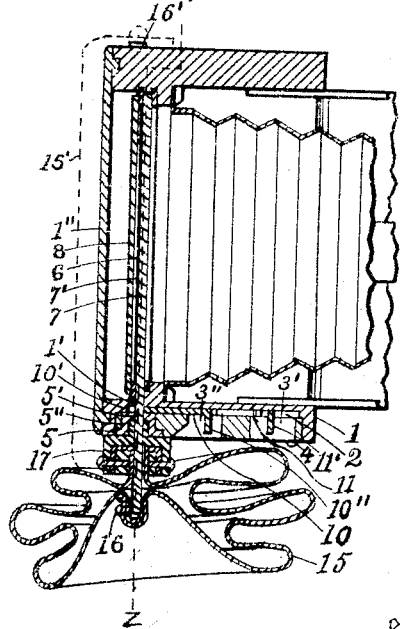
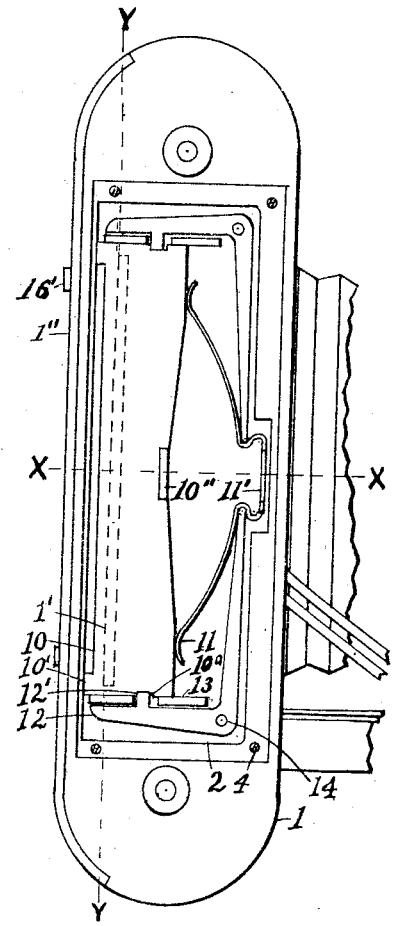
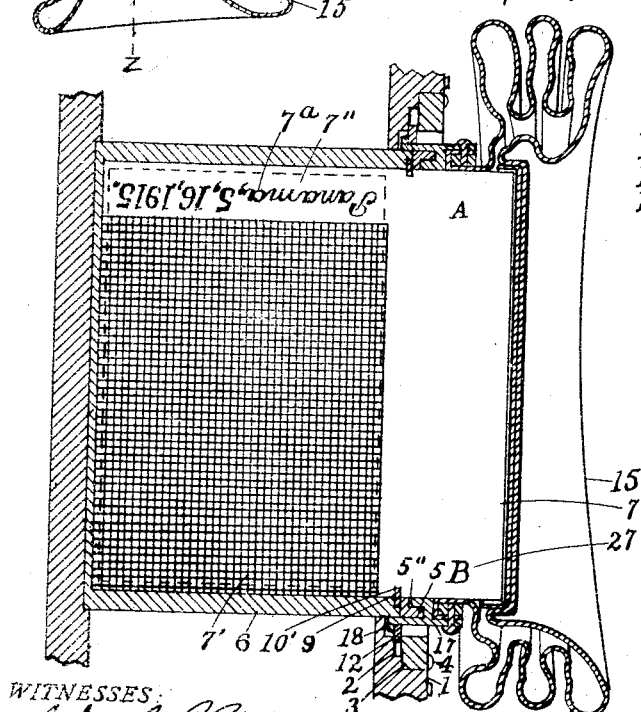
WITNESSES
John J. Hinton
Egbert L. Rees
INVENTOR
Isaac Feltenstein
BY George W. Hinton
ATTORNEY I. FELTENSTEIN.
MASKING DEVICE FOR CAMERAS.
APPLICATION FILED MAY 15, 1915.
1,170,522.
Patented Feb. 8, 1916.
2 SHEETS—SHEET 2.
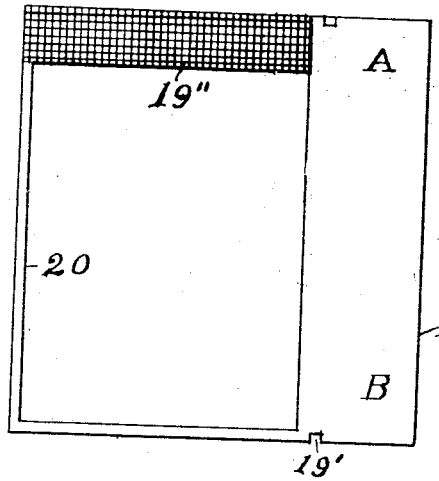
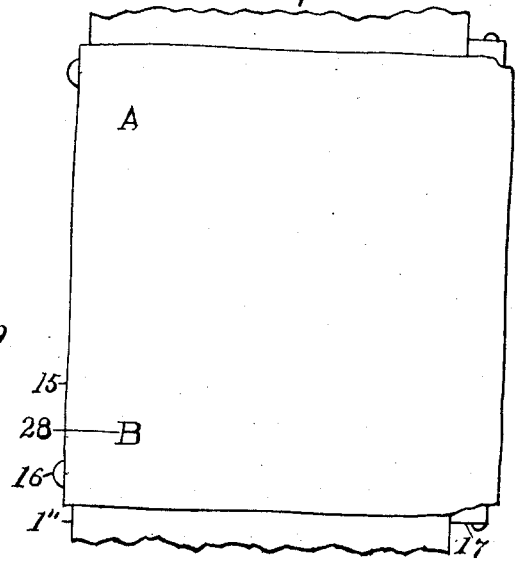
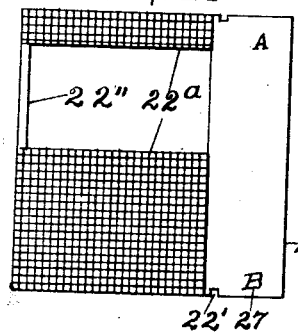
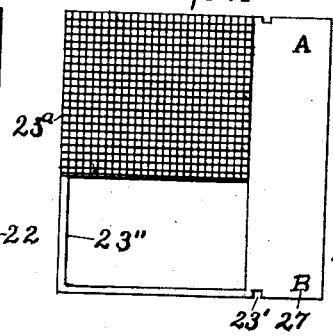
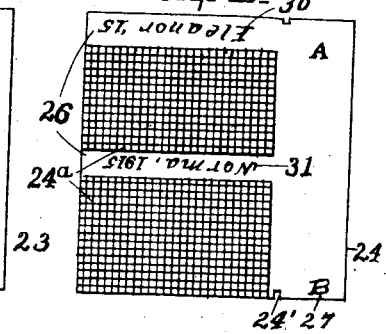
WITNESSES:
John J. Hinton
Egbert L. Rees
INVENTOR.
Isaac Feltenstein
BY
George W. Hinton
ATTORNEY

UNITED STATES PATENT OFFICE.

ISAAC FELTENSTEIN, OF ST. JOSEPH, MISSOURI.

MASKING DEVICE FOR CAMERAS.

1,170,522.  Specification of Letters Patent.  Patented Feb. 8, 1916.

Application filed May 15, 1915. Serial No. 28,366.

*To all whom it may concern:*

Be it known that I, ISAAC FELTENSTEIN, citizen of the United States, residing at St. Joseph, in the county of Buchanan and State of Missouri, have invented certain new and useful Improvements in Masking Devices for Cameras, of which the following is a specification, reference being had therein to the accompanying drawing.

My invention relates to improvements in masking devices for cameras, and the objects of my improvements are, first, to provide devices of this class, by the use of which, the sensitive film in a camera is properly exposed to light for making either one, or a plurality of negatives as desired, and especially for making such negatives, with the negative of an inscription for each one, which inscription shall print black lines upon a white ground in the resulting photograph; second, to so construct and arrange the parts of the masking devices, that extraneous light shall not be allowed to enter the camera through inadvertence of the operator; third, to provide ready packing means in which the masks are packed and secured in flat form upon the back of the camera, and to so construct the packing means that it may be detached from the camera and laid aside in an instant. I attain these objects by the devices illustrated in the accompanying drawing, in which:—

Figure 1 is a horizontal section on the line X X, seen in Fig. 2, looking downward, and showing a mask in position for use. Fig. 2 is a side elevation of a portion of the camera, certain parts being removed for exposing the mask admitting means. Fig. 3 is a transverse section of the camera, on the line Y Y, in Fig. 2, looking to the right, showing an inscription mask in position for use. Fig. 4 is a rear elevation of the mask that is used as a companion to the one seen in Fig. 3. Fig. 5 is a rear view of the camera, showing the mask bag secured thereon. Figs. 6, 7 and 8 are rear elevations of a series of masks, used in making a plurality of views and inscriptions on one film.

Referring to Figs. 1 and 2, camera body 1 has a countersink 2 formed therein, which is covered by lid 3, secured in place by screws 4. Said lid has slide apertures 3' and 3" formed therethrough. Secured in said cover, is the escutcheon 5, which has mask slot 5' formed therethrough. Said escutcheon has countersink 5" formed in its outer surface, adapted to receive the inner portion of the hereinafter described bag connector. Mask admitting slot 1' is formed through camera body 1, in register with mask slot 5', which slots are in register with mask guides 6, secured in said camera body, for guiding the edges of mask 7 and holding said mask in position in front of film 8. Said film may be of any well known type, such as that which is mounted on rolled strips of celluloid, or on glass plates, and the like, for making photographic negatives. Said mask is preferably formed of transparent celluloid of sufficient rigidity to not buckle or wrinkle in use, and has opaque coating adhesively applied thereon, as seen at 7', for masking the greater portion of film 8. The uncoated inscription space 7" has inscription 7ª thereon, which latter is written with an opaque writing fluid and allowed to dry before use. Said coating and inscription space may be of the form and proportions shown, or be of any proportions and configuration desired.

Mask 7 has holding notches 9 formed in its horizontal edges, which are engaged by shutter projections 10', (formed with shutter 10,) for holding said mask in the position seen in Figs. 1 and 3, against removal by accident or inadvertence. Shutter 10 is slidably mounted in countersink 2, and is provided with thumb-piece 10", formed on its front edge. Said shutter is actuated by spring 11 to move toward the rear of said camera body 1, for closing mask slot 1', when mask 7 is removed from the position seen in Fig. 1, into bag 15, as hereinafter described. Said shutter has securing notches 10ª, formed in its upper and lower edges, which are engaged by lever projections 12', formed on the rear portions of the L shaped levers 12. Said shutter is guided, by guides 13, formed with camera body 1. The central portion of spring 11 is engaged with the front ends of levers 12, (see Fig. 2,) for actuating the same to move toward the right. Said spring has thumb-piece 11' formed thereon. The central portions of levers 12 are pivotally mounted in countersink 2, on pivots 14.

The outer edges of mask bag 15 are lapped upon each other and are detachably secured together by snap fasteners 16, of which but one is shown in Fig. 1. Said fasteners may be unfastened from their undesignated fastener members on said bag, and be fastened on fastener members 16′ for holding bag 15 upon the back 1″ of body 1, as indicated by dotted lines 15′ in Fig. 1, and shown in Fig. 5. Since said fasteners and fastener members may be of any desired form, now in use, such as glove fasteners and the like, the same are not shown and described in detail. The inner edge of said bag is secured in the outer portion of bag connector 17, the inner part of the latter being inserted in countersink 5″, and being open for passage of a mask 7, therethrough. Said connector has a hook 18 formed on each end thereof, (see Fig. 3,) said hooks being in engagement with the rear ends of levers 12, for detachably holding said connector in place. The described bag is formed of good flexible light proof fabric, such as rubberized cloth or the like.

Referring to Fig. 4, mask 19 is of the same form, proportions and material as mask 7, and is similarly provided with holding notches 19′. Said mask has the cut-out opening 20, formed therethrough, and also has opaque coating 19″ adhesively secured thereon, for masking from the action of light, that portion of film 8, which is exposed to the light which passes through the previously described inscription space 7″.

In operation, with the parts in the position seen in Fig. 1, the operator of the camera points the lens, (not shown,) toward the sky or any pure white object, and exposes film 8 to light reflected therefrom. Said light passes through said lens, through bellows 21, and through the transparent portions of inscription space 7″, for making a negative of inscription 7ª, in film 8, in the usual manner, well known to the photographer's art. Said operator then pushes thumb-piece 10″ toward the front of the camera, thereby moving slide projections 10′ from notches 9, which releases mask 7. He then with the other hand grasps the outer portion of bag 15, with the outer edge of said mask therein, and thereby moves the latter from the position shown, into said bag, with the folds of the latter straightened to a position easily understood, but not shown. After the mask 7 has passed shutter 10, the latter is moved from the position seen in Fig. 1, to the position seen in Fig. 2, by the pressure thereon of spring 11, which closes slot 1′, and prevents admission of extraneous light therethrough. At this juncture notches 10ª are in register with lever projections 12′, which are moved into said notches by levers 12, actuated by spring 11, which secures shutter 10 in its closed position. Said operator then unfastens the snap fasteners 16, and through the thus opened outer end removes mask 7. He thereafter inserts mask 19 through said open end, into said bag and refastens the fasteners 16. In the previously described manner he then grasps the outer end of said bag, and thereby grasps the outer edge of said mask. With the thumb and index finger of his other hand, he grasps thumb-pieces 10″ and 11′ and moves thumb-piece 10″ toward thumb-piece 11′, which overcomes spring 11 and moves shutter 10, until its projections 10′ are past slot 1′. Said operator then inserts mask 19 through said slot to the position formerly occupied by mask 7. Said operator then releases said thumb piece, upon which shutter 10 is moved by spring 11, until its rear edge is stopped against mask 19, with its projections 10′ in notches 19′. Said operator then points the described camera toward the object to be photographed and exposes the unmasked portion of film 8, to light reflected from said object. Said light passes through cut-out opening 20, thus making a negative of said object, while the previously taken inscription 7ª, is masked from the action of said light, by opaque coating 19″. Mask 19 is thereafter removed from the camera, into bag 15, as previously described; after which fasteners 16 are unfastened and mask 7 is inserted into said bag. For convenience in transporting, said bag is then turned against back 1″ of the camera body 1, and fasteners 16 are fastened upon fastener members 16′ for holding said bag and the therein placed masks in place, as seen in Figs. 5 and 1.

Bag 15 is detached from camera body 1, in the following manner: Fasteners 16 are unfastened from members 16′, and are secured as seen in Fig. 1. The operator then moves thumb-piece 11′ toward the left, (see Fig. 2,) thereby moving the rear ends of levers 12 from each other, until the same are disengaged from hooks 18, (see Fig. 3,) after which he lifts the described connector from escutcheon 5, and removes the thus released connector and bag 15.

In making a plurality of exposures of smaller area, upon the described film, the masks 22, 23 and 24, seen in Figs. 6, 7 and 8, are used in the order named, while a view finder, (not shown) is used on the camera, in the usual, well known manner. The ground glass of said view finder is preferably provided with defining lines, formed thereon, for defining the boundaries of the views to be photographed, which correlate with the masks used. Said masks are provided with holding notches 22′, 23′ and 24′, respectively. Masks 22 and 23 have cut-out openings 22″ and 23″, respectively formed therethrough while the remainder of their operative parts are covered with opaque coatings 22ᵃ and 23ᵃ, respectively. Mask 24 has inscription spaces 26 formed thereon, while the remainder of its operative parts is covered with opaque coating 24ᵃ. All of said masks are provided with mask position designations 27, for determining the proper position in which said masks shall be placed in bag 15, (see Fig. 5,) which bears corresponding designations 28 applied thereon. Inscriptions 30 and 31 are applied in the same manner as the previously described inscription 7″. All of said inscriptions are written or otherwise applied with opaque ink, which is readily removed, without disturbing the previously described opaque coatings, for rendering their mask suitable for repeated use.

It will be understood, that the described subdivisions of the ground glass and of the masks, may be of any plurality and configuration, which practice may determine, and that all of the described masks may be packed in bag 15, for transportation.

Having fully described my invention, what I claim as new and desire to secure by Letters Patent is:—

1. In masking devices for cameras, the combination with a camera adapted to hold a sensitive film therein, of a series of masks formed of transparent material and adapted to be interchangeably inserted one at a time into said camera in front of said film; an opaque coating adhesively secured on a certain portion of one of said series of masks the remaining portion of said mask forming a transparent inscription space adapted to have an opaque inscription applied thereon; another one of said series of masks having an exposure opening formed therethrough in such position that said opening correlates with said opaque coating; another opaque coating on such portion of the last mentioned mask as correlates with said inscription space; admitting means for admitting said masks into said camera in front of said film, one mask at a time; mask guiding means in said camera; and light excluding means for preventing admission of light through said mask admitting means into said camera.

2. The combination with a camera, adapted to hold a sensitive film therein; of a series of masks whereby said film is so masked from light during a series of separate exposures that a series of different objects is photographed on said film; mask admitting means for admitting said series of masks one mask at a time in front of said film; a flexible light proof bag covering said mask admitting means wherefrom said masks are ejected through said mask admitting means into said camera; position designations on said bag; and corresponding mask position designations on each one of said series of masks for determining the position in which said masks shall be placed in said bag.

3. In masking devices for cameras, a body for said camera having a countersink formed in its outer surface and a mask receiving slot therethrough; a shutter slidably mounted in said countersink for covering said slot; a spring whereby said shutter is actuated to cover said slot; securing means actuated by said spring for detachably securing said shutter in position when it is over said slot; releasing means whereby said securing means is manually moved from said shutter for releasing the latter; shutter moving means whereby said shutter is manually moved from over said opening; a lid for said countersink said lid having openings therethrough for affording access to said releasing means and to said shutter moving means; and light excluding means for preventing passage of light through said slot when said shutter is from over the latter.

4. The combination with a camera adapted to hold a sensitive film therein; of a camera body having a countersink formed in its outer surface and a slot formed therethrough opening into said countersink; a shutter slidably mounted in said countersink for closing said slot; shutter guides for laterally guiding said shutter; the latter having securing notches formed in its upper and lower edges; holding projections formed on the rear edge of said shutter; an L shaped lever for each of said notched edges, said levers being pivotally mounted in said countersink; a lever projection on each one of said levers; a spring the central portion of which engages the ends of said levers for actuating the same and thereby moving their projections into said securing notches while the ends of said spring press against the front edge of said shutter for actuating the latter to close said slot; and a mask adapted to be inserted in said slot said mask having holding notches formed in the edges thereof for engagement with said holding projections.

5. The combination with a camera body having a countersink formed in its outer surface and a slot therethrough opening into said countersink; of a cover for said countersink; an escutcheon secured in said lid, said escutcheon having a countersink formed in its outer surface and a slot therethrough in register with the first mentioned slot; a bag for covering the said countersunk slot; a bag connector having its outer portion connected with the inner edges of said bag and its inner portion in the escutcheon countersink, said inner portion having a slot therethrough in register with the previously mentioned slots; a hook on each end of said connector engaged with the rear ends of said L shaped levers; and a mask in said slots extending into said camera body said mask having holder notches in its upper and lower edges for engagement with said holder projections.

In testimony whereof I affix my signature in the presence of two witnesses.

ISAAC FELTENSTEIN.

Witnesses:
MATTHEW B. HINTON,
W. M. ROBERTS.

Copies of this patent may be obtained for five cents each, by addressing the "Commissioner of Patents, Washington, D. C."